July 12, 1927.
S. M. McKEE
1,635,722
PISTON RING APPLIER
Filed Feb. 23, 1927
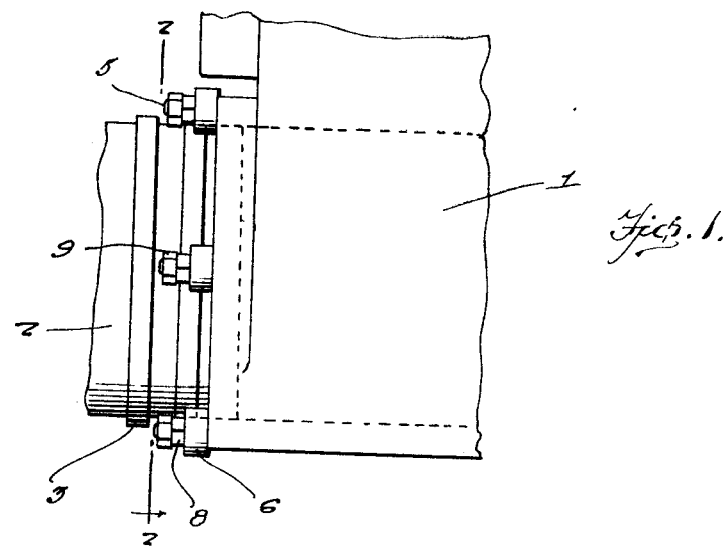
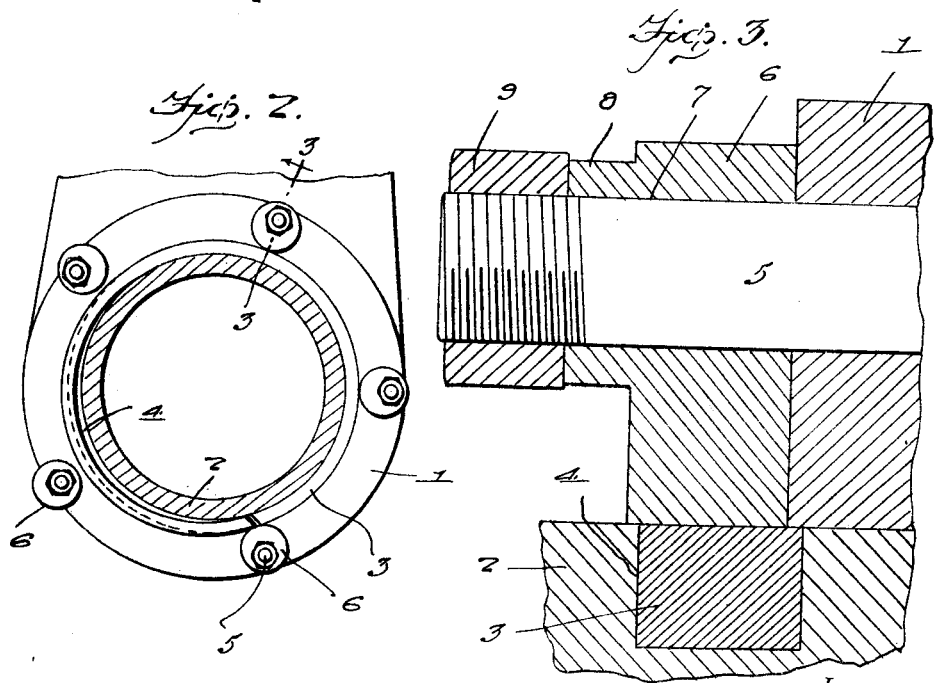
Inventor
Samuel M. McKee
By Clarence A. O'Brien
Attorney Patented July 12, 1927.

1,635,722

UNITED STATES PATENT OFFICE.

SAMUEL M. McKEE, OF CUMBERLAND, MARYLAND.

PISTON-RING APPLIER.

Application filed February 23, 1927. Serial No. 170,267.

The present invention relates to improvements in piston ring appliers and has reference more particularly to a means for applying the piston ring on the piston of a steam cylinder.

Due to the size of the piston of a steam cylinder, considerable difficulty is often experienced in applying the piston rings and also at times a considerable number of men are necessary to apply these piston rings.

An important object of the present invention is to provide a simple and efficient means for association with the usual stud bolts which extend from the end of the cylinder, whereby the piston rings may be readily and easily applied on the piston and which will obviate the necessity of having to employ a number of persons in using the device.

A still further object of the invention is to provide a piston ring applier of the above mentioned character which is simple in construction, inexpensive, and furthermore adapted to the purposes for which the same is designed.

Other objects and advantages of this invention will become apparent during the course of the following description.

In the accompanying drawing forming part of this specification and in which like numerals are employed to designate like parts throughout the same:

Figure 1 is a side elevation of the piston ring applying means embodying my invention showing the same mounted on the stud bolts which project from the end of a steam cylinder and showing the device in use, Figure 2 is a sectional view taken approximately on the line 2—2 of Figure 1 looking in the direction of the arrows showing certain of the circular blocks engaging the piston rings, and Figure 3 is an enlarged sectional view taken approximately on line 3—3 of Figure 2 showing more specifically the manner in which the piston ring applier is mounted on the stud bolt.

In the drawing wherein for the purpose of illustration is shown the preferred embodiment of my invention, the numeral 1 designates a portion of a steam cylinder in which is operable the piston 2. The piston rings 3 are arranged in annular grooves 4 provided therefor in the piston 2 in the manner well known in the art. The stud bolts which project from the rear end of the cylinder 1 in the usual manner are illustrated at 5 and a packing gland or head which is usually supported on the stud bolts is removed when my device is used for applying the rings on the piston.

My improved piston ring appliance comprises a circular block 6 which is formed out of metal and the same is provided with an eccentrically located bore 7, the bore being of a diameter slightly greater than the diameter of the stud bolt 5 in order that the blocks may be readily and easily placed thereon and furthermore rotated.

Formed on the outer face of the circular block 6 is the tool-engaging nut 8, the bore thereof being small and in registry with the bore 7 of the block 6. In the present instance, the nut is illustrated as being hexagonal. It is, however, to be understood that I do not limit myself to a particular shape of the nut. Any desired shape may be provided for the purpose of permitting a suitable tool such as a wrench or the like to engage the nut to facilitate the turning of the eccentrically mounted block on its stud.

As many eccentric blocks are provided as there are stud bolts and the same are positioned on the stud bolts with the inner faces of the blocks disposed adjacent the inner end of the cylinder 1 and for the purpose of preventing the accidental displacement of the eccentric blocks from the stud bolts suitable nuts 9 may be threaded on the outer threaded ends of the stud bolts as is clearly illustrated in the drawing.

In use, the eccentric circular blocks 6 are mounted on the respective stud bolts 5 and are disposed in such a manner as to engage a piston ring 3 to be initially placed on the piston around its channel or groove 4. The tool-engaging nut 8 of each block is then turned so as to bring the eccentrically mounted block into engagement with the piston ring so as to force the same into the groove and each circular block is successively rotated until the piston ring has been properly applied on the piston in its groove so that the same will be free to enter the cylinder 1.

The provision of a piston ring applier of the above mentioned character will at all times be proper and efficient in its operation and will not only save considerable time and labor but will not necessitate the employment of a number of men such as must be done with the type of piston ring applier now generally used for applying the rings on pistons used in conjunction with the steam cylinders.

This device can be used on the steam cylinders of locomotives as well as on the steam cylinders of stationary engines.

Also instead of the tool engaging nut 8, each block may be formed with suitable openings for receiving one end of a rod, to facilitate the turning thereof.

While I have shown the preferred embodiment of my invention, it is to be understood that various changes in the size, shape and arrangement of parts may be resorted to without departing from the spirit or sacrificing any of the advantages of the appended claims.

Having thus described the invention, what I claim is:—

1. In a means for applying piston rings on the piston of a steam cylinder, a series of piston ring engaging members eccentrically mounted on the stud bolts which project from the end of the cylinder, each of said members being provided with means for rotating the same on its respective stud bolts.

2. In a means for applying piston rings on the piston of a steam cylinder, a series of piston ring engaging members eccentrically mounted on the stud bolts which project from the end of the cylinder, and means on the outer face of each member adapted to be engaged by a tool for effecting the rotation of each member.

3. In a means for applying piston rings on the piston of a steam cylinder, wherein stud bolts project from the end of the cylinder, a circular block eccentrically mounted on each stud bolt and adapted to engage the piston ring; and a tool engaging member associated with the block for carrying the same.

4. In a means for applying piston rings on the piston of a steam cylinder, wherein stud bolts project from the end of the cylinder, a circular block eccentrically mounted on each stud bolt and adapted to engage the piston ring, and a tool engaging member associated with the block for carrying the same, said tool engaging member comprising a nut formed on the outer face of the circular blocks, the bore thereof being in registry with the bore of the block and through which a stud bolt extends.

In testimony whereof I affix my signature.

SAMUEL M. McKEE.